(12) United States Patent
Lomet

(10) Patent No.: US 7,668,961 B2
(45) Date of Patent: Feb. 23, 2010

(54) UNILATERAL WEB SERVICES INTERACTION CONTRACT

(75) Inventor: David Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1264 days.

(21) Appl. No.: 10/947,707

(22) Filed: Sep. 23, 2004

(65) Prior Publication Data

US 2006/0080670 A1 Apr. 13, 2006

(51) Int. Cl.
G06F 15/16 (2006.01)
G06F 11/00 (2006.01)

(52) U.S. Cl. .............................. 709/230; 714/4; 714/15
(58) Field of Classification Search ................. 709/218, 709/224; 714/15
See application file for complete search history.

(56) References Cited

U.S. PATENT DOCUMENTS

| 6,016,495 | A | 1/2000 | McKeehan et al. |
| 6,519,627 | B1 | 2/2003 | Dan et al. |
| 6,604,135 | B1 | 8/2003 | Rogers et al. |
| 6,609,200 | B2 | 8/2003 | Anderson et al. |
| 2005/0015643 | A1* | 1/2005 | Davis et al. ..................... 714/4 |

OTHER PUBLICATIONS

E.M. Verharen, F. Dignum, and S. Bos. Implementation of a Cooperative Agent Architecture based on the Language-action Perspective. In Intelligent Agents, vol. 1365 of Lecture notes in Artificial Intelligence, pp. 31-44. Springer-Verlag, 1998.
D.H. Steves, et al. An ACID Framework for Electronic Commerce. The First International Conference on Telecommunications and Electronic Commerce, 1998. 16 pages.
H. Maruyama, T. Nakamura, and T. Hsieh. Optimistic Fair Contract Signing for Web Services. Proceedings of the 2003 ACM Workshop on XML Security, pp. 79-85, 2003.
R. Barga, et al., Improving Logging and Recovery Performance in Phoenix/App. ICDE Conference, Boston, MA (Mar. 2004), pp. 486-497.
R. Barga, et al., PErsistent Applications Via Automatic Recovery, IDEAS Conference, Hong Kong (Jul. 2003), pp. 258-267.
R. Barga, et al., Recovery Guarantees for Multi-tier Applications, ICDE Conference, San Jose, CA (Mar. 2002), pp. 543-554.

(Continued)

*Primary Examiner*—Patrice Winder
*Assistant Examiner*—Xiang Yu
(74) *Attorney, Agent, or Firm*—Lee & Hayes, PLLC

(57) ABSTRACT

The present invention leverages a unilaterally-based interaction contract that enables applications to have a persistent state and ensures an exactly-once execution despite failures between and by communicating entities, permitting disparate software applications to be robustly supported in an environment where little is known about the implementation of the interaction contract. In one instance of the present invention, a web services interaction contract provides a communicating application with duplicate commit request elimination, persistent state transitions, and/or unique persistent reply requests. The present invention permits this interaction contract to be supported by, for example, a persistent application, a workflow, a transaction queue, a database, and a file system to facilitate in providing idempotent executions for requests from a communicating application.

27 Claims, 8 Drawing Sheets

OTHER PUBLICATIONS

IBM developerWorks, Web Services Coordination (WS-Coordination), Coordination and Atomic Transactions, Sep. 16, 2003, 7 pages.

Eric Christensen, et al., IBM Corporation, W3C, Web Services Description Language (WSDL) 1.1, 2001, Ariba, IBM, Microsoft, 51 pages.

Microsoft Corporation, Microsoft.NET Framework Developer Center, 2004, 4 pages.

OASIS UDDI, UDDI Spec TC Technical Note, www.UDDI.org, Juy 19, 2002.

* cited by examiner

UNILATERAL WEB SERVICES INTERACTION CONTRACT

RELATED APPLICATIONS

This application is related to co-pending and co-assigned applications entitled "RECOVERY GUARANTEES FOR GENERAL MULTI-TIER APPLICATIONS," client reference MS160329.01 filed on Sep. 4, 2001 and assigned Ser. No. 09/946,050; "PERSISTENT STATEFUL COMPONENT-BASED APPLICATIONS VIA AUTOMATIC RECOVERY," client reference MS 160330.01 filed on Sep. 4, 2001 and assigned Ser. No. 09/946,092; "RECOVERY GUARANTEES FOR SOFTWARE COMPONENTS," client reference MS 193585.01 filed on May 23, 2002 and assigned Ser. No. 10/154,261; and "OPTIMIZED RECOVERY LOGGING," client reference MS302351.01 filed on Nov. 24, 2003 and assigned Ser. No. 10/720,622. The above-noted applications are incorporated herein by reference.

TECHNICAL FIELD

The present invention relates generally to computer systems, and more particularly to systems and methods for providing an interaction contract for web services.

BACKGROUND OF THE INVENTION

Computers have become an integral part of society in many different facets. They can be found in businesses, homes, and even cars. In the beginning computers were standalone devices with limited means to input and output information. As computing technology progresses, however, there is an overwhelming desire for them to communicate with each other to relay information. The techniques for communication can be simple dial-up modem connections or complex satellite communications and the like. Although techniques to communicate have improved, such as with the advent of the Internet, the ability for one software application to talk to another software application is often hampered by software language, protocol, and database storage disparities. Applications are often written in different software languages that utilize varying interface protocols, making it difficult to efficiently communicate with other applications. This disparity has been heightened with the development of the Internet. It has brought a tremendous increase of users "online," all of whom want to communicate with different hardware platforms, different software applications, and different operating systems.

Attempts have been made at creating a ubiquitous computing platform as a solution to this issue. However, this has not proven successful for many reasons—one of which is that no one entity has control over all users in a given scenario. When control is available, such as within a corporate environment, operating systems, hardware, and software applications can be controlled such that they can easily communicate. However, oftentimes companies find outside software vendors who offer a better or less expensive alternative to their current applications and desire to use those products instead. Thus, disparate applications even find their way into environments where one entity can control the computing systems. In order to resolve these types of disparity, a solution called "web services" was introduced.

Web services (WS) allow organizations to communicate data without intimate knowledge of each other's IT systems behind a firewall. Unlike traditional client/server models, such as a web server/web page system, web services do not provide a user with a graphical user interface (GUI). Rather, web services share business logic, data, and processes through a programmatic interface across a network. Thus, applications interface as compared to users interfacing. The web services can then be added to a GUI, such as a web page or an executable program, to offer specific functionality to users. Moreover, web services allow different applications from different sources to communicate with each other without time-consuming custom coding, and because the communication is in extensible markup language (XML), web services are not tied to any one operating system or programming language.

These web services offer a practical solution when they can be controlled by an entity such as in an enterprise environment. This is due to the fact that software applications can be made to interface efficiently when both communicating applications can be augmented by the entity. Robustness of the communications can be ensured through a "bilateral" communication process that adheres to a single protocol standard. This type of process, however, does not lend itself well to the open internet environment where all parties to a communication cannot be controlled by a single entity. For example, users wishing to purchase a product from a business online utilize any type of application, hardware, and browser that they possess. The business itself cannot control the products that the user employs. Thus, bilateral types of solutions do not easily apply to this type of open environment.

For example, if a user wants to purchase an airline ticket online and a failure occurs during the ticket purchase transaction, it is possible that the user might click the purchase button more than once if they do not receive an immediate response. The airline may not realize that the transaction had momentarily failed and interpret the multiple purchase requests by the user to mean that they want multiple tickets. Obviously, the user would not be happy to receive a bill for two tickets if only one is desired. The disparity of the systems needs to be overcome so that the transaction can occur with a certain amount of robustness. In other words, the user's products need to be able to communicate reliably with other diverse and often unknown products.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to computer systems, and more particularly to systems and methods for providing an interaction contract for web services. A unilaterally-based interaction contract is leveraged to provide a persistent state means that ensures an exactly-once transaction execution despite failures between communicating entities. This allows disparate software applications to communicate robustly without intimate knowledge of the other applications via an opaque process. In one instance of the present invention, a web services interaction contract (WSIC) additionally provides a communicating application with duplicate commit request elimination, persistent state transitions, and/or unique persistent reply requests. The present invention can employ, for example, a persistent application, a workflow, a transaction queue, a database, and a file system to facilitate in providing idempotent executions for requests from a communication application. Thus, the present invention provides an extremely robust, unilaterally-based means that can be utilized by unknown entities to ensure state persistence and automatic recovery of component-based applications.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
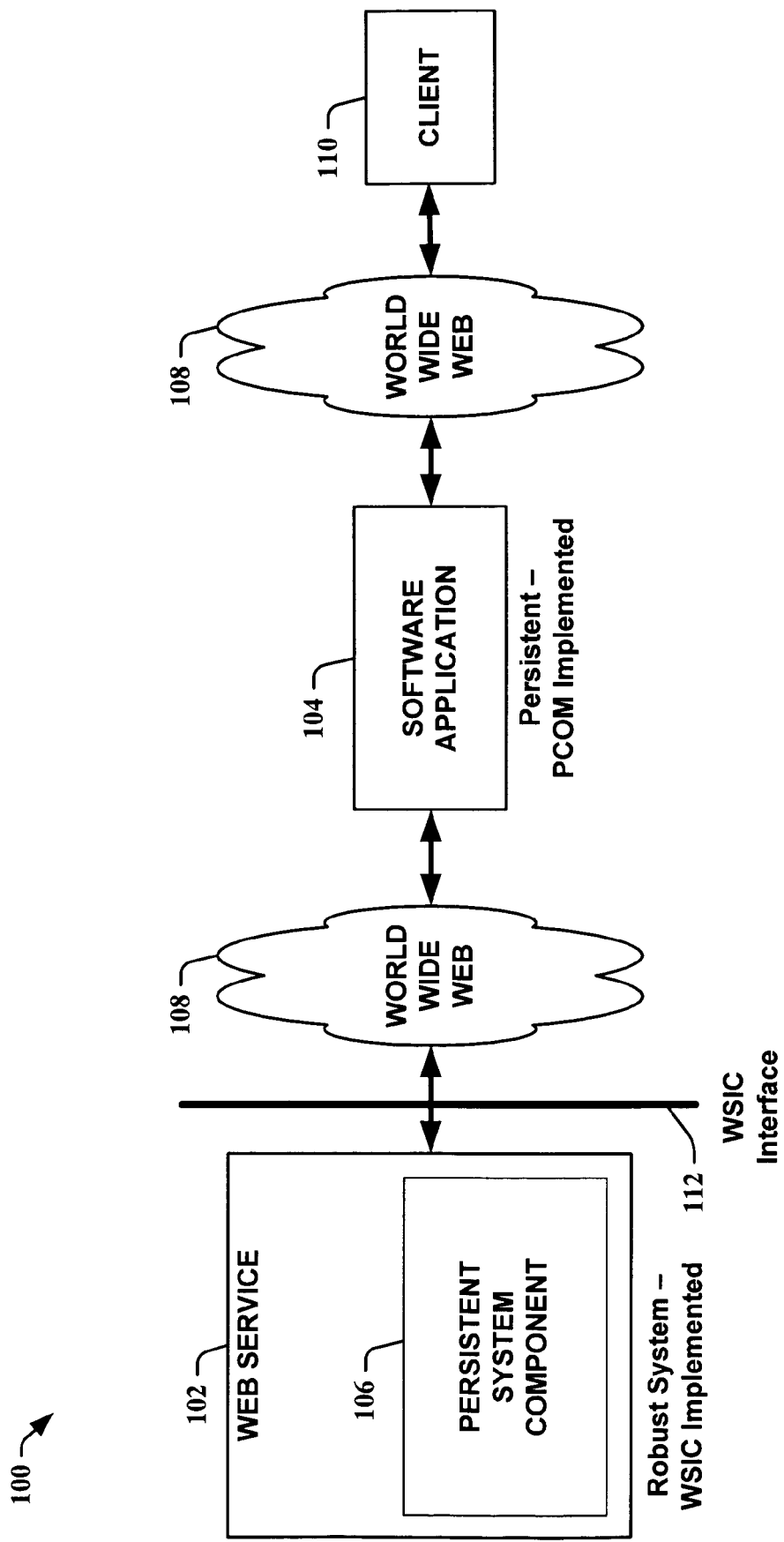
FIG. 1 is a block diagram of a persistent system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Current web services do not provide the levels of robustness guarantees typically associated with more traditional transaction processing utilized within an enterprise. Part of the problem lies in opaque interfaces, minimal influence by a web service over applications that utilize it, and insufficient trust and interdependence to permit the utilization of typical interaction contracts that can guarantee survival of system crashes. The present invention resolves these problems by providing a web services interaction contract (WSIC) that can be exploited to provide state persistence and automatic recovery for applications. A WSIC provides a unilateral pledge to the outside world of its applications where nothing is required of the applications. One instance of the present invention employs implements this by logging interactions and maintaining a transaction database.

In FIG. 1, a block diagram of a persistent system 100 in accordance with an aspect of the present invention is shown. The system 100 is comprised of a web service 102 that interfaces with a software application 104 via the World Wide Web (WWW) 108. One skilled in the art will appreciate that other communication means besides the WWW can be utilized with the present invention such as satellite communications, radio communications, telephonic communications, and other hardwired communications and the like. A client 110 also interfaces with the software application 104 via the WWW 108. The web service 102 is comprised of, in part, a persistent system component 106.

The persistent system component 106 interfaces with the software application via a web service interface 112. The web service 102, when it supports a WSIC, generates interaction information that facilitates in recovery of the software application 104 when a failure condition occurs, hence enabling exactly-once execution for the software application 104. This prevents multiple requests for an action yielding multiple identical actions. For example, if a user, such as the client 110, is attempting to purchase an airline ticket and a web page freezes, the user may repeatedly click on "purchase ticket" with no apparent response. However, multiple purchase requests may have been sent, unbeknownst to the user. Without employing an instance of the present invention in a web service, the multiple clicks could create multiple purchases, leading to an unsatisfied customer/user. The persistent system component 106 prevents this from occurring, increasing the robustness of the component-based software application. The persistent system component 106 accomplishes increased robustness for the software application 104 on a unilateral basis. That is, the work of enabling exactly once execution is done unilaterally by the web service 102, without requiring anything from the software application 104. (However, if the software application 104 is to exploit the work done by the web service 102, it 104 will need to follow an appropriate interaction protocol.)

Figure 2:
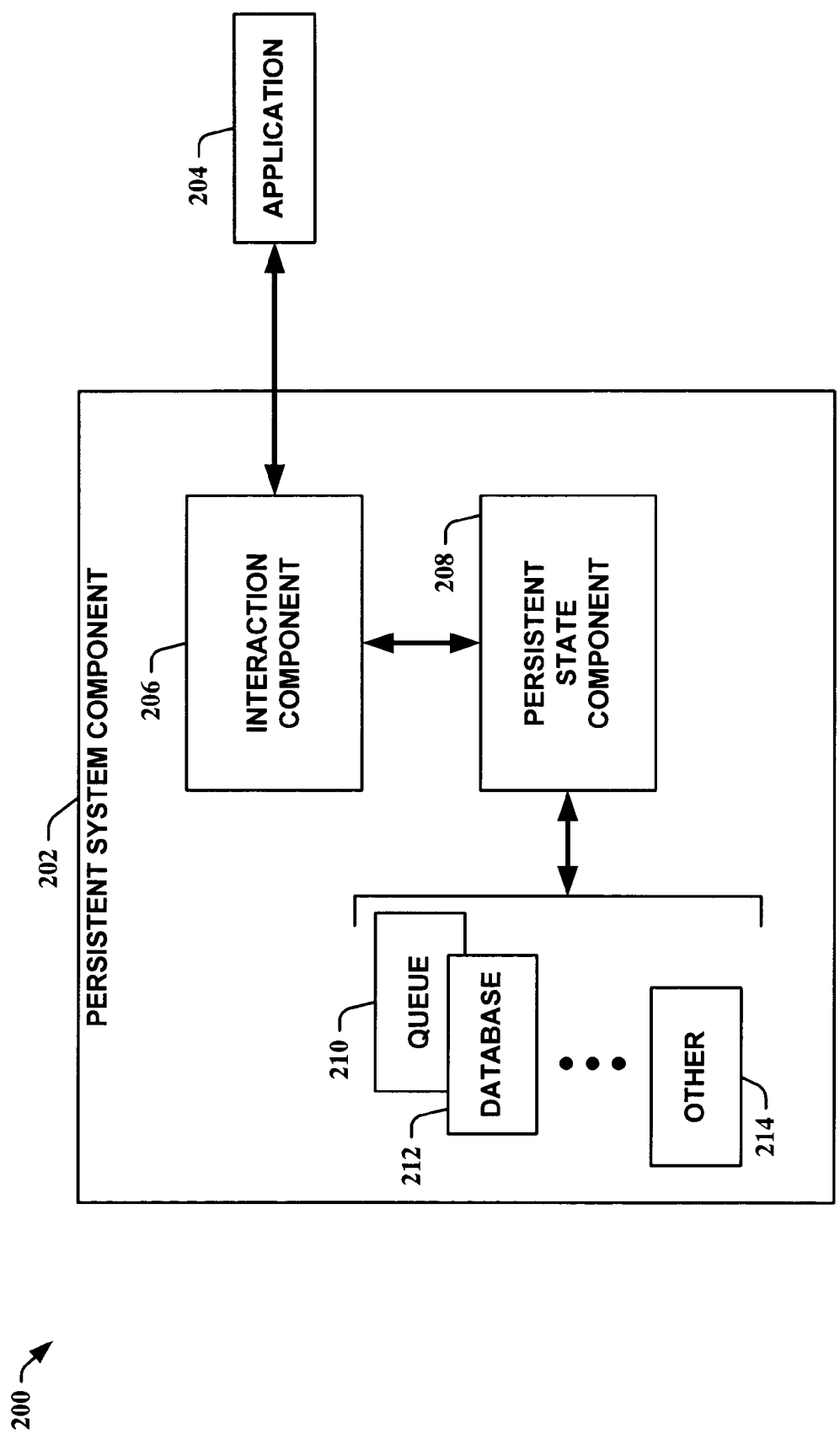
FIG. 2 is an example block diagram of a web service in accordance with an aspect of the present invention.

Referring to FIG. 2, an example block diagram of a web service 200 in accordance with an aspect of the present invention is illustrated. The web service 200 is comprised of a persistent system component 202 that interfaces with a software application 204. The persistent system component 202 is comprised of an interaction component 206 (that supports the web services interaction contract), a persistent state component 208, and state persistence facilitating processes 210-214. The state persistence facilitating processes 210-214 are comprised of a queue process 210, a database process 212, and "other" process 214. Other process 214 represents additional processes that can be employed by instances of the present invention to facilitate in maintaining persistence. One skilled in the art will appreciate that the present invention affords great flexibility in selecting appropriate processes that facilitate in yielding persistence.

The interaction component 206 interacts with the software application 204 to provide the persistent state component 208 with interactions. The interactions include, but are not limited to, requests for services and cancellation of service requests and the like. The persistent state component 208 utilizes the state persistence facilitating processes 210-214 to guarantee that its state can survive system crashes and faithfully capture the work requested by the software application 204. These processes, because they are within a web service, are not visible to the software application 204. To enable exactly once execution for the software application 204, requests employ a unique request ID (identification) that enables tracking in message queue processes and/or database processes utilizing unique request ID fields. The persistent state component 208 utilizes the unique request ID to ensure that an intended work item is not performed more than once. This ensures idempotent execution, increasing software application robustness. Once a work item is completed, a reply message can be sent to the software application 204. This reply message is made persistent to ensure that if a fault condition occurs in the software application 204 and/or the web service 200, a correctly written software application 204 can recover. Additionally, one skilled in the art will appreciate that the interaction component 206 and/or the persistent state component 208 can have functionality that resides within a single component and/or distributed among multiple components. Likewise, these components 206, 208 can be local to a web service and/or remote to a web service and/or the software application 204. Further, the software application 204 can include other entities such as, for example, another web service, a client application, or a middle-tier application that is part of an application server, etc.

Web services are increasingly important as more and more cross enterprise business is conducted over the internet. Traditionally, an application program would, in order to be robust, normally be required to execute a number of distributed transactions. This "stateless application" approach (no execution state exists outside of a transaction) is what has been used in transaction processing. But transaction processing is normally restricted to within an enterprise or organization. For applications that cross organizational boundaries, this approach is not likely to be acceptable. It is likely that many web services will be reluctant to participate in such distributed transactions since two phase commit (2PC) is a blocking protocol, and even without blocking, the elapsed time to commit, the cost of log forces are very substantial disincentives to utilizing distributed transactions.

Application programs that will exploit web services to provide functionality across multiple autonomous organizations demand the kinds of robustness guarantees that have been associated with the more traditional transaction processing utilized within an enterprise. This is difficult to accomplish in the web services context where autonomy is a dominant concern, and opaque interfaces, essential to solve the heterogeneous systems problem, are the rule. So, an application has no right to know what happens behind a web service interface and has little leverage in controlling it as well. A web service also has minimal influence over the applications that utilize it. Therefore, a web service cannot prescribe what an application must do that is necessary for its own robustness.

Interaction contracts for guaranteeing that applications can survive system crashes have been previously noted in patent applications Recovery Guarantees For General Multi-Tier Applications (Ser. No. 09/946,050), Persistent Stateful Component-Based Applications Via Automatic Recovery (Ser. No. 09/946,092), Recovery Guarantees For Software Components (Ser. No. 10/154,261), and Optimized Recovery Logging (Ser. No. 10/720,622). This involved a two way contract between components, and hence works within an enterprise, where there is sufficient trust, and sufficient interdependence. In a web-type environment, those attributes no longer exist. In contrast, the present invention describes a web service with a unilateral guarantee, implemented behind the opaque message passing interface in whatever manner the web service can or opts to do, that enables an appropriately written application to ensure its own robustness.

Historically, the growth of web services has been impeded by the barriers of legacy systems, differing protocols, the lack of robustness, and a lack of an integrative framework. Web services place special emphasis on "information hiding," an idea that originated with Parnas over 30 years ago (see, D. Parnas; On the Criteria To Be Used in Decomposing Systems into Modules; CACM 15(12): 1053-1058 (1972)). The idea is to minimize what applications need to know in order to interact meaningfully with the service. Web services exploit message protocols, utilizing a common syntactic framework (e.g., XML with simple object access protocol (SOAP)) but are otherwise opaque in terms of how they are implemented behind their service front. This makes it possible for diverse systems to interact, by hiding intimate details behind the service interface.

There is a long history of efforts to make distributed applications robust. Most efforts evolved in the transaction processing (TP) community, with TP monitors and distributed transactions. And such transaction processing efforts have been relatively successful in the context of relatively closed systems. There are efforts to extend this style of support to the web services world (e.g., WS-Coordination (see, WC3; Web Services Coordination; http://www-106.ibm.com/developerworks/library/ws-coor/)). However, TP has had much less impact on highly distributed, largely autonomous, heterogeneous, and wide scale e-commerce.

Classic transaction processing relies heavily on distributed transactions. But even in the classic TP world, distributed transactions are not usually very "distributed." They are utilized mostly for partitioned databases and for stateless applications interacting with queue managers. It is rare for this technology to be employed across enterprise boundaries, or sometimes even organizational boundaries within an enterprise. This can be due to the fact that protocols are intimately tied to a particular implementation base, or these protocols require too much compromise of autonomy. But, without distributed transactions, there are no TP-based solutions. The situation then reverts to either non-robust applications or to special case solutions.

The present invention utilizes, in part, "interaction contracts" (see e.g., R. Barga, D. Lomet, and G. Weikum; Recovery Guarantees for General Multi-Tier Applications; *ICDE* 2002) as the framework for robust web services. Interaction contracts enable applications to be persistent across system crashes, without distributed transactions. They enable applications to interact with "transactional services" with the application neither participating in the transaction nor perhaps even aware that there is a transaction involved. Thus, atomicity can be encapsulated within an "opaque" web service, and supported by transactions whose distribution can be limited to the traditional TP domain, and whose participants could be databases and queue managers and the like.

Atomicity within web services is still highly desirable. One wants an e-commerce sale to be all or nothing: no money—no product; money—product. The in-between states are generally unacceptable. But whether this atomicity is provided by a single local transaction, a distributed transaction, a workflow system, or some other technology, should be immaterial at the level of the web service.

Interaction contracts capture precisely what needs to be done for applications to be persistent, surviving system failures. These applications live outside of any transaction, and because they are persistent, they can robustly provide program logic for dealing with web services failures, which might have resulted from one or more transaction failures within the web service. This is important, as traditional TP with stateless applications have no convenient place to put program logic dealing with transaction failures. However, there is more to robustness than persistence (the ability for an application to survive system crashes). Traditional TP can provide, not just applications that survive system failures and have certain atomicity properties, but also solutions for other robustness attributes: availability, scalability, and load balancing. These attributes can also be provided with interaction contracts and persistent applications. Interaction contracts are obligations for each party involved in sending or receiving a message. The intent of the obligations is to ensure that both sides of the interaction can agree, even in the presence of a system crash of one or both of the systems, as to what the interaction consisted of and whether it occurred. Each party to the contract guarantees that enough information is stably recorded so that they can continue execution after a system crash, with agreement as to whether the interaction occurred and the message that was exchanged.

When exploiting interaction contracts, which will usually be within an enterprise, elements of a distributed system are characterized into three component types: (1) persistent component (Pcom): a component whose state is guaranteed to survive system crashes, the execution result being as if the crash did not occur; (2) external component (Xcom): a component that is outside of the control of the infrastructure and cannot be guaranteed; and (3) transactional component (Tcom): a component that executes transactions, and that guarantees that the effects of committed transactions will persist and effects of uncommitted transactions will be erased.

Between persistent components and each component type, there is a particular flavor of interaction contract that needs to be honored for persistence and exactly once execution to be assured. Typically, no system can guarantee failure masking under all circumstances. For example, in a system interaction with a human user, if the system crashes before all input from the user is stored stably (usually by logging), then the user will need to re-enter the input. Despite this, the "interaction" can be "exactly once," and the window of vulnerability can be minimized. That is what an external interaction contract does. For the other interactions, the window is "shut."

As there are three component types, there are also three types of interaction contracts: (1) persistent interaction contract (PIC): between persistent components; (also known as a "committed interaction contract"); (2) external interaction contract (XIC): between external component and persistent component; and (3) transaction interaction contract (TIC): between persistent component and transactional component.

A persistent interaction contract (PIC) is described in detail infra. For external interaction contracts, refer to Recovery Guarantees for General Multi-Tier Applications, id. Transaction interaction contracts, which provide framework for the present invention's web services contract, are also described infra. A persistent interaction contract between two Pcoms consists of the following obligations:

Sender Obligations:
S1: Persistent State: The sender promises that its state at the time of the message or later is persistent.
S2: Unique Persistent Message
S2a: Sender promises that each message is unique and that it will send message repeatedly until receiver releases it from this obligation (R2a)
S2b: Sender promises to resend the message upon explicit receiver request until receiver releases it from this obligation (R2b).

Sender obligations ensure that an interaction is recoverable, i.e., it is guaranteed to occur, though not with the receiver guaranteed to be in exactly the same state.

Receiver Obligations:
R1: Duplicate Message Elimination: Receiver promises to eliminate duplicate messages (which sender may send to satisfy S2a).
R2: Persistent State
R2a: Receiver promises that before releasing sender obligation S2a, its state at the time of message receive or later is persistent. The interaction is now stable, i.e., the receiver knows that the message was sent.
R2b: Receiver promises that before releasing the sender from obligation S2b, its state at the time of the message receive or later is persistent without the need to request the message from the sender. The interaction is now installed, i.e., the receiver knows that the message was sent, and its contents.

PICs ensure that the states of Pcoms not only persist but that all components "agree" on which messages have been sent and what the progress is in a multi-component distributed system. S2 and R1 are essentially the reliable messaging protocol for assuring exactly once message delivery, coupled with message persistence, while S1 and R2 provide persistent state for sender and receiver. Reliable messaging is not sufficient by itself to provide robust applications. Also, the PIC describes the requirements more abstractly than a protocol in order to maximize optimization opportunities. For example, it is not necessary to log an output message to persist it if the message can be recreated by replaying the application from an earlier state.

In a bilateral-type framework (see, R. Barga, D. Lomet, S. Paparizos, H. Yu, and S. Chandrasekaran; Persistent Applications via Automatic Recovery; *IDEAS* Conference July 2003; p 258-267), the infrastructure intercepts messages between Pcoms. It adds information to the messages to ensure uniqueness, resends messages, and maintains tables to eliminate duplicates; it logs messages as needed to ensure message durability. Message durability permits the replaying of components from a log, so as to guarantee state persistence. Because the interception is transparent, the application executing as a Pcom needs no special provisions in order to be persistent, though some limitations exist on what Pcoms can do.

A transaction interaction contract (TIC) is a model for dealing with web services. The TIC explains how a Pcom reliably interacts with, for example, transactional database systems and what a transactional resource manager (e.g., database management system (DBMS)) needs to do, not all of which is normally provided, so as to ensure exactly-once execution.

When a Pcom interacts with a Tcom, the interactions are within the context of a transaction. These interactions are of two forms: (1) explicit transactions with a "begin transaction" message followed by a number of interactions within the transaction. A final message (for a successful transaction) is the "commit request," where the Pcom asks the Tcom to commit the work that it has done on behalf of the Pcom and (2) implicit transactions, where a single message begins the transaction and simultaneously requests the commit of the work. This message functions as the "commit request" message.

For explicit transactions, the messages preceding the commit request message do not require any guarantees. Should either Pcom or Tcom crash, the other party knows how to "forget" the associated work. Thus, the components do not get confused between a transaction that started before a crash and another that may start after the crash. The latter is a new transaction. Further, at any point before the "commit request" message, either party can abandon the work and declare the transaction aborted. And, it can do so unilaterally and without notice. The only Tcom obligation is the ability to truthfully reply to subsequent Pcom messages with an "I don't know what you are talking about" message (though more informative messages are not precluded).

At the end of a transaction that is desired to commit, the world where contracts are required is re-entered. Interactions between Pcom and Tcom follow the request/reply paradigm. For this reason, a TIC is expressed in terms that include both the request message and the reply message. The obligations of Pcom and Tcom are now described for a transaction interaction contract initiated by the Pcom's "commit request" message.

Persistent Component (Pcom) Obligations:

PS1: Persistent Reply-Expected State: The Pcom's state as of the time at which the reply to the commit request is expected, or later, must persist without having to contact the Tcom to repeat its earlier sent messages.

The persistent state guarantee thus includes the installation of all earlier Tcom replies within the same transaction, e.g., structured query language (SQL) results, return codes.

Persistence by the Pcom of its reply-expected state means that the Tcom, rather than repeatedly sending its reply (under TS1), need send it only once. The Pcom explicitly requests the reply message, should it not receive it, by resending its commit request message.

PS2: Unique persistent commit request message: The Pcom's commit request message must persist and be resent, driven by timeouts, until the Pcom receives the Tcom's reply message.

PR1: Duplicate Message Elimination: The Pcom promises to eliminate duplicate reply messages to its commit request message (which the Tcom may send as a result of Tcom receiving multiple duplicate commit request messages because of PS2).

PR2: Persistent Reply Installed State: The Pcom promises that, before releasing Tcom from its obligation under TS1, its state at the time of the Tcom commit reply message receive or later is persistent without the need to request the reply message again from the Tcom.

Transactional Component (Tcom) Obligations:

TR1: Duplicate elimination: Tcom promises to eliminate duplicate commit request messages (which Pcom may send to satisfy PS2). It treats duplicate copies of the message as requests to resend the reply message.

TR2: Atomic, isolated, and persistent state transition: The Tcom promises that before releasing Pcom from its obligations under PS2 by sending a reply message, that it has proceeded to one of two possible states, either committing or aborting the transaction (or not executing it at all, equivalent to aborting), and that the resulting state is persistent.

TS1: Unique persistent (faithful) reply message: Once the transaction terminates, the Tcom replies acknowledging the commit request, and guarantees persistence of this reply until released from this guarantee by the Pcom. The Tcom promises to resend the message upon an explicit Pcom request, as indicated in TR1 above. The Tcom reply message identifies the transaction named in the commit request message and faithfully reports whether it has committed or aborted.

A TIC has the guarantees associated with reliable message delivery both for the commit request message (PS2 and TR1) and the reply message (PR2 and TS1). As with the PIC, these guarantees also include message persistent. In addition, in the case of a commit, both Pcom (PS1) and Tcom (TR2) guarantee state persistence as well. As with PIC, the TIC requirements are stated abstractly.

Unlike persistent components, traditional transaction processing applications are stateless. That is, there is no meaningful state outside of a transaction except what is stored explicitly in a queue or database. And, in particular, there is no active execution state. Each application "step" is a transaction; the step usually is associated with the processing of a single message.

Usually a step involves reading an initial state from a queue, doing some processing, updating a database, digesting a message, and writing a queue (perhaps a different queue), and committing a distributed transaction involving queues, databases, and message participants. This requires 2PC unless read/write queues are supported by the same database that is also involved. When dealing with distributed TP, queues are frequently different resource managers, and so is the database. So typically, there are two log forces per participant in this distributed transaction.

Because all processing is done within a transaction, handling transaction failures requires special case mechanisms. Typically, a TP monitor will retry a transaction some fixed number of times, hoping that it will succeed. If it fails repeatedly, then an error is posted to an administrative (error) queue to be examined manually. The problem here is that no application logic executes outside of a transaction. Program logic fails when a transaction fails.

There is a relationship between interaction contracts and distributed transactions. Both typically require that logs be forced from time to time so as to make information stable. But the interaction contract is, in fact, the more primitive notion. And, if one's goal is application program persistence, only the more primitive notion is required. Only if rollback is needed is the full mechanism of a transaction required. Further, in web services, as for workflow in general, "rollback" (compensation) is frequently separate from the transaction doing the forward work. For distributed, web services based computing, it is unlikely that the tight coupling and high overhead needed for transactions will make them the preferred approach.

The setting for web services is quite different from traditional transaction processing. The TP world is usually completely within an enterprise, or where that isn't the case, between limited clients and a service or services within a single enterprise. But web services are intended specifically for the multi-enterprise or at least multi-organizational situation. Site autonomy is paramount. This is why web services are "arms length" and opaque, based on messages, not remote procedure calls (RPC). This is why the messages are self-describing and based on XML.

Because web services are opaque, a transaction interaction contract is not quite appropriate. An application is not entitled to know whether a web service is performing a "real" transaction. It is entitled to know only something about the end state. Further, a web service provider will be very reluctant to enter into a commit protocol with applications that are outside of its control. But web services need to be concerned about robust applications. In particular, a web service should be concerned with enabling exactly-once execution for applications. This is the intent of the web services interaction contract.

There can be many application interactions with a web service that require no special guarantees. For example, an application asks about the price and availability of some product. Going even further, a customer may be shopping, and have placed a number of products in his shopping cart. There is, at this point, no "guarantee" either that the customer will purchase these products, or that the web service will have them in stock, or at the same price, when a decision is eventually made. While remembering a shopping cart by the web service is a desirable characteristic, it is sufficient that this remembering be a "best effort," not a guarantee. Such a "best effort" can be expected to succeed well over 99% of the time. Because of this, it is not necessary to take strenuous measures, only ordinary measures, to do the remembering. But a guarantee must always succeed, and this can require strenuous efforts. However, these efforts are reserved for the cases that actually require them.

By analogy with the transaction interaction contract, guarantees are needed only when work is to be "committed." Unlike with the TIC, an application is not entitled to know whether the web service has opened a transaction for it. So, an application may agree with the web service about an identifier (much like a transaction ID) for the unit of work being done but this unit has no force with respect to any guarantees. That is, as Tcom's can forget transactions, so WS's can forget units of work. An application can likewise forget this unit of work. No one has agreed to anything yet. There is no direct way an application can tell whether an ID is for a transaction, or not. (Of course, it might start other sessions with other IDs and see whether various actions are prevented, and perhaps infer what is going on.) Whether there is a transaction going on during this time is not part of any contract.

A web service can require that an application remember something, e.g., the ID for the unit of work, as it might for a transaction, or as it might for a shopping session with a particular shopping cart. But this is not a subject of the guarantee. The guarantee applies exactly to the message in which work is going to be "committed." Everything up to this point has been "hypothetical." Further, if the WS finds the "commit request" message not to its liking because of information related to these earlier messages, it can "abort." Indeed, it can have amnesia in any circumstance, and when that happens, there is no guarantee that the WS will remember any of the prior activity.

Figure 3:
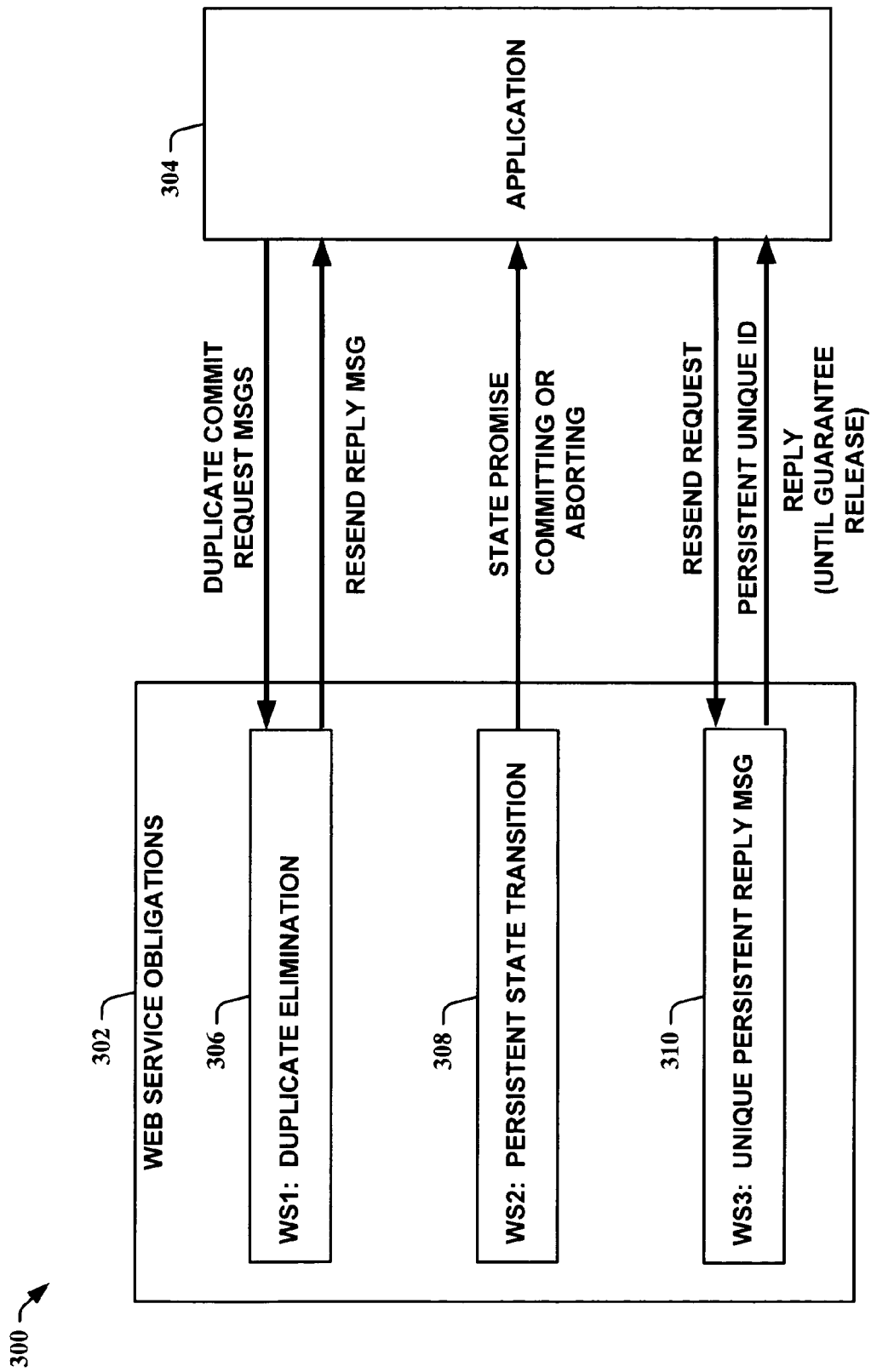
FIG. 3 is an illustration of a web service obligation flow in accordance with an aspect of the present invention.

It is when the "final" message is sent, e.g., when a user is to purchase an airline ticket, that a guarantee is needed. In a web services interaction contract, only the web service makes guarantees. If the application also takes actions of the sort required of a Pcom in the transaction interaction contract, then it can ensure its persistence. Without the WSIC, it would not be possible to implement Pcoms interacting with web services. But the web service contract is independent of such an arrangement. Thus, a WSIC is a unilateral pledge to the outside world of its applications; nothing is required of the applications. In FIG. 3, an illustration of a web service obligation flow 300 in accordance with an aspect of the present invention is depicted. Interaction of web service obligations 302 and an application 304 are illustrated. The web service obligations 302 including WS1: Duplicate elimination 306, WS2: Persistent state transition, and WS3: Unique persistent reply message 310 are elaborated on infra:

Web Service (WS) Obligations

WS1: Duplicate elimination: WS promises to eliminate duplicate commit request messages. It treats duplicate copies of the message as requests to resend the reply message.

WS2: Persistent state transition: The WS promises that it has proceeded to one of two possible states, either "committing" or "aborting" and that the resulting state is persistent.

WS3: Unique persistent (faithful) reply message: WS awaits prompting from the application to resend, accomplished by the application repeating its commit request message. Once the requested action terminates, the WS replies acknowledging the commit request, and guarantees persistence of this reply until released from this guarantee. The WS promises to resend the message upon explicit request. Message uniqueness permits an application to detect duplicates.

One skilled in the art will appreciate that this aspect of the present invention does not impose restrictions on the implementation of how the web service meets its WSIC obligations. This is unlike the TIC, where the transaction component is required to have an atomic and isolated action (transaction). Thus, a web service employing the present invention can meet its requirements utilizing perhaps a persistent application and/or a workflow and the like. The present invention can exploit transactional queues and/or databases and/or file systems and the like. These obligations ensure that the request to the web service is "idempotent," i.e., exactly-once execution. Note that the WS action taken, like a logged database operation, does not need to be idempotent. How an application can utilize a WSIC to ensure robust behavior is discussed infra.

The present invention allows a WSIC to guarantee, as with the TIC, that if an application is written following the rules for the Pcom in the TIC, then the application can be made to survive system crashes. How Pcoms can be made persistent is shown in (R. Barga, S. Chen, D. Lomet; Improving Logging and Recovery Performance in Phoenix/App, *ICDE* 2004), (R. Barga, D. Lomet, S. Paparizos, H. Yu, and S. Chandrasekaran; Persistent Applications via Automatic Recovery; *IDEAS* 2003), (R. Barga, D. Lomet, G. Shegalov, and G. Weikum; Recovery Guarantees for Internet Applications *ACM TOIT* 2004), and (R. Barga, D. Lomet, and G. Weikum; Recovery Guarantees for General Multi-Tier Applications; *ICDE* 2002).

The WSIC ensures that an interaction can be re-requested should a failure occur during a web service execution. In this case, the WSIC ensures that the web service activity is executed exactly once, despite potentially receiving multiple duplicate requests (WS1), and that the web service "committed" state, once reached is persistent (WS2), and that the reply message is not lost because it is persistent, and it is unique to ensure that it cannot be mistaken for any other message (WS3), duplicates to be eliminated by the application.

Typically, programming utilizing persistent applications is easier and more natural than programming utilizing stateless applications. A stateful persistent application need not be arranged into a "string of beads" style, where each "bead" is a transaction that moves the state from one persistent queue to another. Rather, the application is simply written as the application logic demands, with persistence provided by logging and by the ability to replay crash interrupted executions [see, (R. Barga, S. Chen, D. Lomet; Improving Logging and Recovery Performance in Phoenix/App, *ICDE* 2004), R. Barga, D. Lomet, S. Paparizos, H. Yu, and S. Chandrasekaran; Persistent Applications via Automatic Recovery; *IDEAS* July 2003; p 258-267), (R. Barga, D. Lomet, G. Shegalov, and G. Weikum; Recovery Guarantees for Internet Applications; *ACM TOIT* 2004), and (R. Barga, D. Lomet, and G. Weikum; Recovery Guarantees for General Multi-Tier Applications; *ICDE* 2002)]. And it is this program logic that can deal with an error, either exercising some other execution path or at least reporting the error to some end user, or both.

Instances of the present invention can utilize several implementations for the web service that fulfill the WSIC obligations. The present invention's flexibility permitted by an opaque web service can be exploited for both implementation ease and to enable persistent applications. An instance of the present invention can, for example, be utilized for a generic order entry system. It can respond to requests about the stock of items it sells, it can permit a user to accumulate potential purchases in a "shopping cart." And, finally, when the client (application or end user) decides to make a purchase, the "commit request" for this purchase is supported by a web service interaction contract that will enable exactly once execution.

A "conventional" transaction processing method of implementing a web service employing an instance of the present invention includes utilizing message queues [see, (P. Bernstein and E. Newcomer; Principles of Transaction Processing; Morgan Kaufmann, 1997) and (J. Gray and A. Reuter; *Transaction Processing: Concepts and Techniques*; Morgan Kaufmann, 1993)]. When an application makes a request, the web service enqueues the request on its message queue. This executes as a transaction to ensure the capture of the request. The application must provide a request ID utilized to uniquely identify the work item on the queue. The message queue permits only a single instance of a request and/or reply with a given request ID. The request is executed by being dequeued from the message queue, and the order is entered into the order database, perhaps inventory is checked, etc. When this is complete, a reply message is enqueued to the message queue. This reply message may indicate the order status, what the ship date might be, the shipping cost and taxes, etc. This is the WS2 obligation and part of the WS3 obligation, since both the state and the message are guaranteed to persist.

Figure 4:
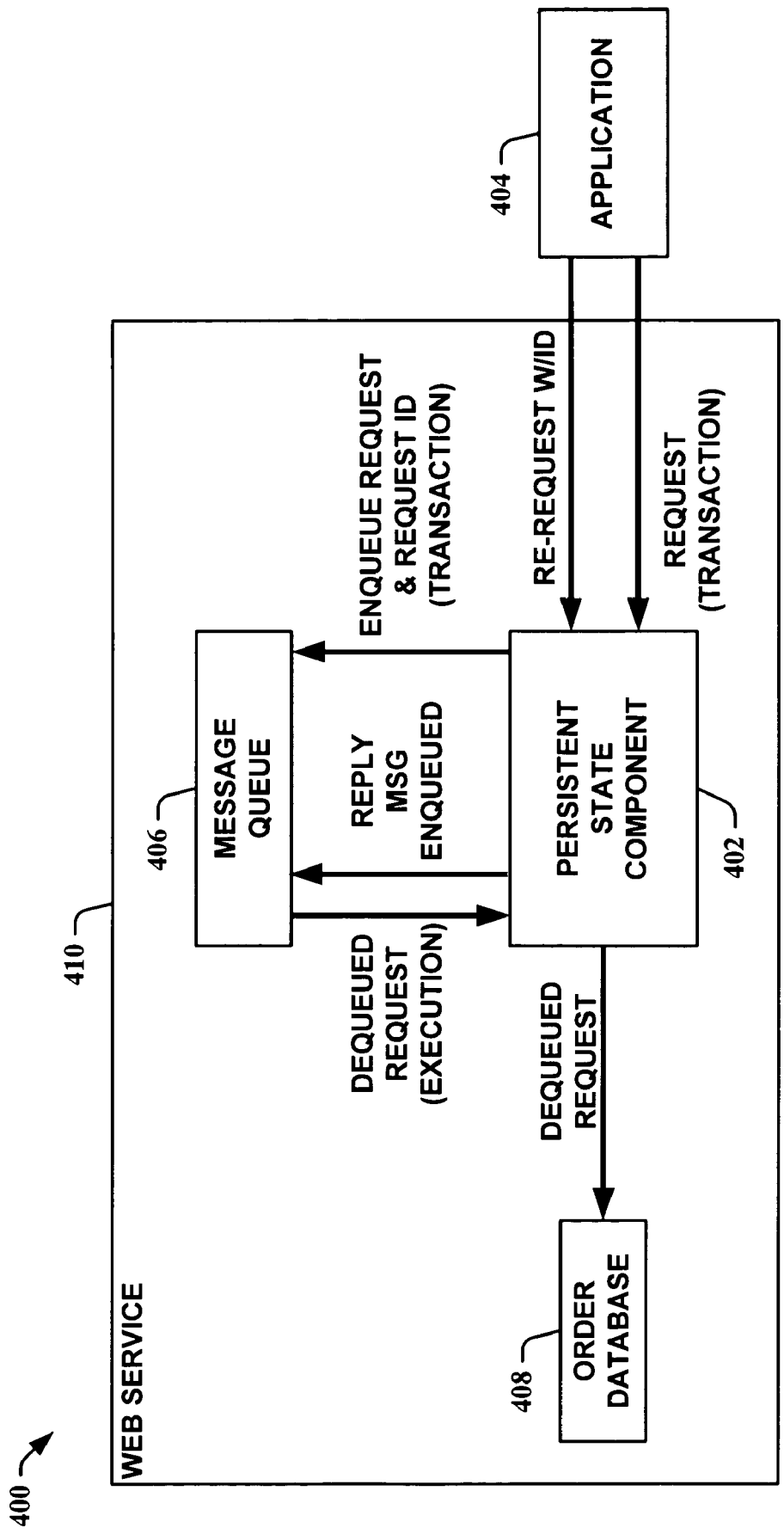
FIG. 4 is an illustration of a persistent system flow in accordance with an aspect of the present invention.

The application resubmits its request if a reply does not arrive in the expected time. The web service checks the message queue for the presence of the request. If not found, the request is enqueued. If it is found, the web service waits for the request to be processed and the reply entry available. If the reply is already present, it is returned directly to the application. The queue has made the reply durable. The web service ensures that request and reply are unique so that duplicates are eliminated, satisfying WS1. FIG. 4 illustrates this process with a persistent system flow 400 that utilizes a persistent state component 402 inside a web service 410 to provide the functions necessary. It 402 interfaces with an application 404 and employs a message queue 406 to provide the robustness. The persistent state component interfaces with an order/work item database 408 as well.

Note that if the application executes within a transaction, as is the case for traditional transaction processing, and its transaction fails, there is no convenient place to handle the failure. But with the present invention, even when the web service utilizes conventional queued transaction processing, the application can be a persistent one. When that is the case, application logic can handle web service failures. The application is indifferent to how the web service provides the WSIC guarantees, only that they are provided, enabling application persistence.

In another instance of the present invention, the implementation of the web service can be changed to provide the WSIC guarantees in a simpler and more efficient manner if the web service has the freedom to modify database design. Duplicate elimination, a persistent state transition, and a persistent output message are all guaranteed by adding a request ID field to each order in the order database. An order in the order table is entered utilizing a SQL insert statement. This table is defined with a uniqueness constraint, permitting only one order with the given request ID to be entered.

If the activity in the web service is interrupted by a system crash, then there are a number of possible cases.
1. No trace of the request exists because the transaction updating the order table was not committed prior to the crash. In this case, it is as if the request has not been seen. A "persistent" application will resend the request.
2. The transaction that updates the order table has been committed. Subsequent duplicate requests are detected when an order with the given request ID is again attempted to be inserted into the order table. The duplicate is detected, the transaction is bypassed, and the original reply message is generated again based on the order information in the table.

This implementation avoids the need to have the persistent message part of the WSIC released explicitly. The request ID remains with the order for the entire time that the order is relevant. With the traditional transaction processing approach, the release for the persistence guarantee is done with the commit of a dequeuing operation for the reply on the message queue.

The present invention utilizes a WSIC that provides substantial flexibility. Thus, a web service can employ different implementations and still be within the scope of the present invention. Message queues and embedded unique IDs in databases are two ways of accomplishing this. But, one skilled in the art can appreciate that there are other acceptable approaches that fall within the scope of the present invention.

Because the WSIC is an opaque characterization of requirements for a web service, an application program utilizing the web service can essentially do whatever it wants, since the WSIC is a unilateral guarantee by the web service. The application can proceed as it wants since it has no obligations under the WSIC. If the application does not implement any robustness measures, the program state is not persistent across system crashes. However, even in this case, the WSIC guarantees are still useful. With respect to the supra order entry system example, for instance, it is useful for an end user to ask about an order's status. And having a persistent state reflecting the order is usually considered a minimal requirement for business data processing needs. If the application wants to realize exactly-once semantics for its request, then the WSIC enables this robustness property to be realized. The application still needs to implement the Pcom side of the transaction interaction contract (TIC). That is, the application becomes persistent when it assumes the obligations of the persistent component in a TIC.

To construct long duration workflows, it is usually a requirement that some form of compensation action be possible for each forward action of the workflow. To support this kind of scenario, each "action" of a web service is associated with a "cancel" (or undo) action. This says nothing about atomicity. The "cancel" activity can be as opaque as the original action. It says nothing about the details of the "inverse" action. But it puts the responsibility for the cancel (or undo) action on the web service. One way of dealing with this is to submit the same ID utilized for the commit request with a cancel request (which itself is a form of "commit request" obeying the TIC obligations). There may be a charge assessed for this under some circumstances, and that should be part of the WSDL description of the web service (see, WC3; Web Services Description Language (WSDL) 1.1; http://www.w3.org/TR/wsdl). The response message to this cancel request can be something like "request cancelled." This is independent of whether the "forward" request was ever received or executed since once the request is cancelled, there should be no requirement that the web service remember the original request.

By supporting a "cancel request," a web server enables an application to program a compensation action should the application need to "change plans." Note that this says nothing about how the application figures out what needs undoing, etc. Again, web services are opaque. But by providing a "cancel request," they enable an application to be written that undoes the earlier work as appropriate. There need be no requirement that a web service provide a "cancel request." But, there is also no requirement that an application program utilize any specific web service. It is likely that if it is defined in this way, many web services would be willing to support "cancel request," especially if it were possible to charge for it. A "cancel" request may only be a best efforts cancellation, e.g., the canceling of an order to buy or sell shares of stock. If the cancellation fails, then there is an obligation to faithfully report that failure. In this case, the web service is obligated to maintain the original action state so as to be able to generate a persistent "cancellation failed" message.

Persistent states and persistent message obligations of the parties to an interaction contract may require an eventual release. Application programs that exploit the obligations eventually terminate. An order is eventually filled and at that point becomes of historical interest but not of current interest. It can also be desirable to release contracts. For web services employing the present invention, the obligations are unilateral and apply only to the web service. Any application effort to exploit the WSIC, e.g., to provide for its persistence, is purely at its own discretion. Some alternative approaches for a web service with respect to how the web service's obligations are released can include, but are not limited to:

No release required: This is both very useful and very simple for applications. It means that no matter how long the application runs, the web service will retain the information needed to effectively replay the interaction. A variant of this is that, for example, once an order is shipped, the shipped object ends the WSIC obligations. So it is frequently possible to remove information about old orders (old interactions) from the online system without compromising the WSIC guarantees, and without requiring anything from the application.

Release encouraged: In this scenario, when an application releases the web service from its WSIC obligations, the web service can remove information associated with the interactions from the online system. If only a small number of apps do not cooperate, that will not be a major issue. Storage is cheap and plentiful. A further step here is to "strongly" encourage release, e.g., by giving cooperators a small discount. Another possibility is to eventually deny future service until some old WSIC's are released. This distinguishes well-behaved applications from rogues, and eventually limits what the rogues can do.

Release required: When web service providers feel that it is too much of a burden on them to maintain interaction information in their online system, an application can be required to release the contract. A frequent strategy is to stipulate that the contract is released at the time of the next contact or the next commit request. If there is no such additional contact that flows from the application logic, then release can be done at the time the application terminates (or its session terminates). Of course, stipulations can be ignored. So a further "clause" in the web service persistence guarantee might "publish" a time limit on the guarantee. For example, one might safely conclude that most applications requesting a web service would be complete within four hours of the commit request having been received, or within one day, etc. This permits "garbage collecting" the information that is older than the published guarantee.

The existence of web services supporting WSICs can frequently enable persistence for applications more efficiently than traditional transaction processing. Typically, with traditional transaction processing, each message exchange is within a separate transaction. Input state on a queue and one message are consumed, and the output state is placed on another queue, then the transaction is committed. Thus, there are two log forces per resource manager (message source, input queue, and output queue) and two for the transaction coordinator.

Utilizing interaction contracts, there is an opportunity to avoid multiple forced log writes. The application may have several interactions, each with a different web service. Assuming that contract release is either not required, or occurs on the next interaction, it is not necessary for the application to log each of these interactions immediately to make them stable, as is done by committing transactions in classic TP. These interactions are stable via replay, utilizing the sender's (web service's) stable message. This results in many fewer forced log writes. Each web service can require a log force, and eventually the application will need to force the log, but this can be amortized over multiple web services. So, "asymptotically," there might be as few as one log force per method call instead of several.

Thus, the present invention provides an opaque means that typically permits robust, i.e., persistent stateful applications, to be realized at lower cost than traditional transaction processing. Allowing an application to be a stateful one has two advantages: (1) it is a more natural programming style than the "string of beads" style required by traditional TP and (2) it enables program logic in the persistent application to deal with transaction failures, something that is not easily accommodated in traditional TP.

Figure 5:
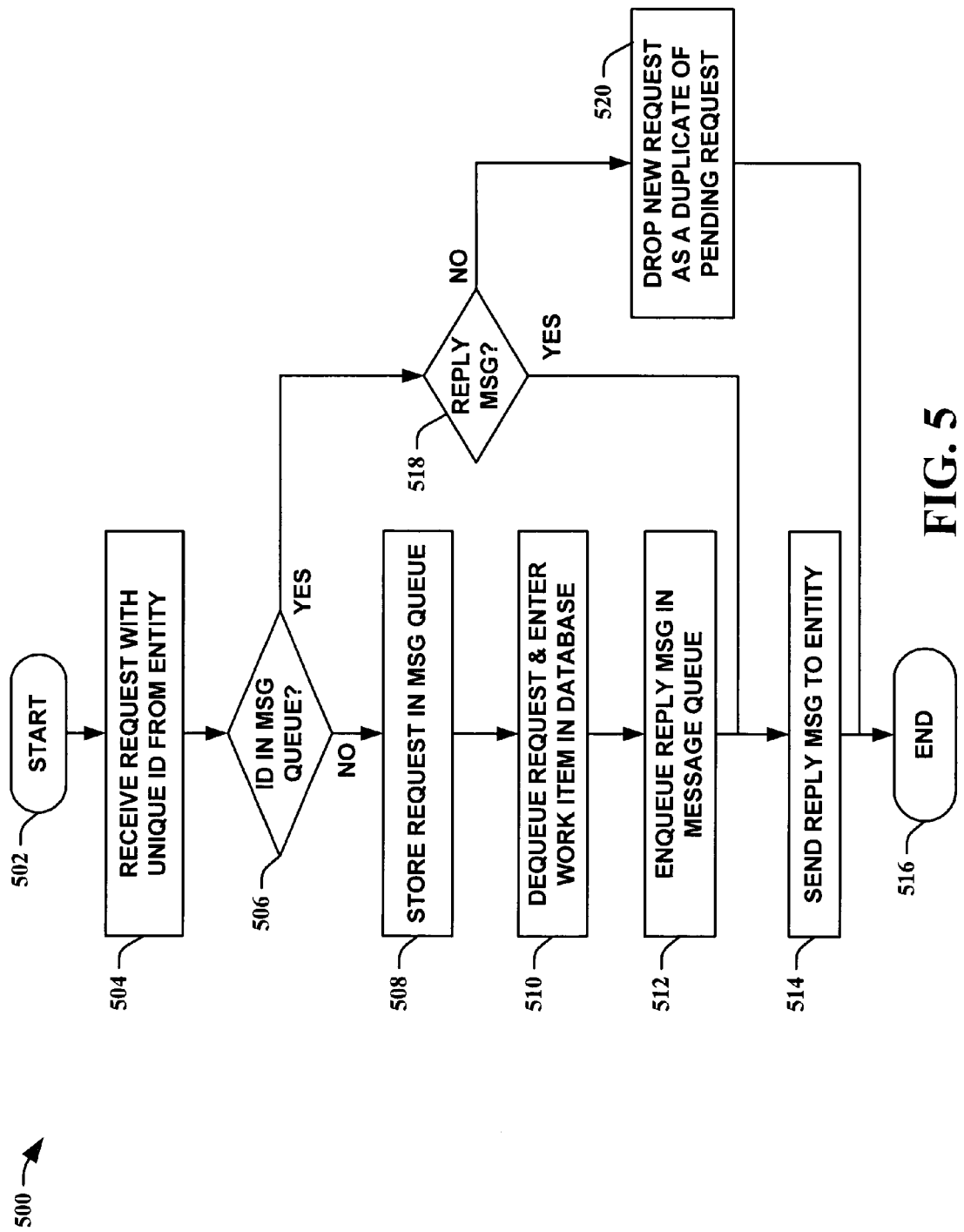
FIG. 5 is a flow diagram of a method of supporting a WSIC in accordance with an aspect of the present invention.
Figure 6:
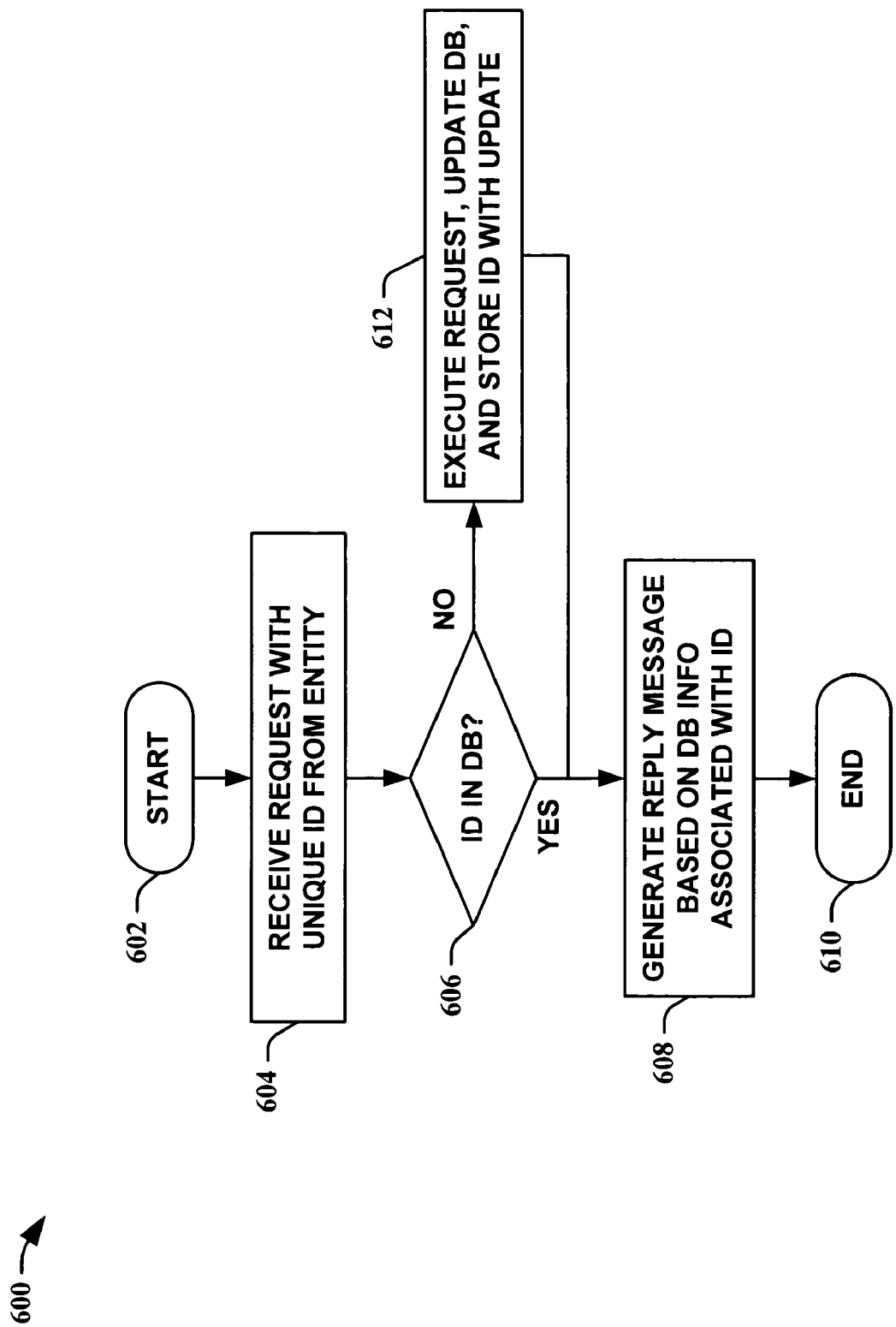
FIG. 6 is another flow diagram of a method of supporting a WSIC in accordance with an aspect of the present invention.

In view of the exemplary systems shown and described above, methodologies that may be implemented in accordance with the present invention will be better appreciated with reference to the flow charts of FIGS. 5-6. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

Referring to FIG. 5, a flow diagram of a method 500 of supporting a WSIC in accordance with an aspect of the present invention is depicted. The method starts 502 by receiving a request with a unique ID from an entity 504. A determination is then made as to whether the unique request ID is currently being tracked in a process such as, for example, via a message queue 506. If the unique request ID is absent from the message queue (or other tracking mechanism), the unique request ID is stored in the message queue. When appropriate, the request is dequeued and a work item represented by the request is entered into a work item database 510. When the work item is completed, a reply message is generated which is then enqueued in the message queue 512. This message is then sent to the requesting entity at 514, ending the flow 516. If, however, it is determined that the unique request ID is present in the message queue 506, a determination is made as to whether it is present as a request message or a reply message at 518. If a request message exists for that unique request ID, then this is a duplicate of a pending request, and the new request is dropped as a duplicate 520, ending the flow 516. If a reply message for that unique request ID is present 518, the request is also a duplicate of a completed request and the flow continues at sending the reply message to the entity in response to the request 514, ending the flow 516.

Looking at FIG. 6, another flow diagram of a method 600 of supporting a WSIC in accordance with an aspect of the present invention is illustrated. The method 600 starts 602 by receiving a request with a unique ID from an entity 604. A determination is then made as to whether the unique request ID exists in a modified database that employs fields for unique request IDs 606. If the unique request ID is present, a reply message is generated based on the information in the database that is associated with the ID 608, and the flow ends 610. However, if the unique request ID is absent in the database, the request is executed, updating the database and storing with the update the ID for it 612. A reply message is then generated 608 and the flow ends 610. One skilled in the art will appreciate that this method 600 provides an alternative to the message queue process described supra.

Figure 7:
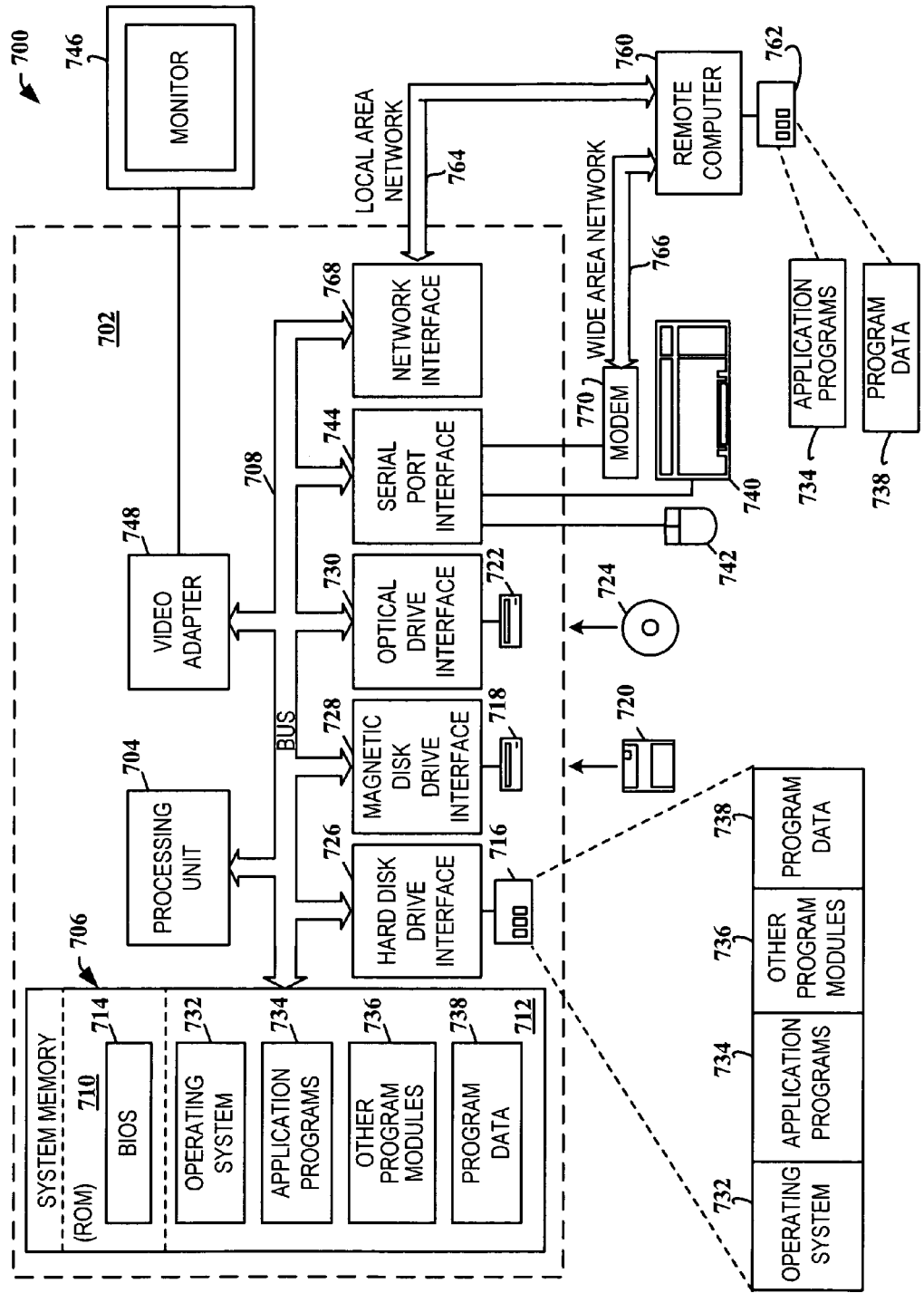
FIG. 7 illustrates an example operating environment in which the present invention can function.

In order to provide additional context for implementing various aspects of the present invention, FIG. 7 and the following discussion is intended to provide a brief, general description of a suitable computing environment 700 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on standalone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 7, an exemplary system environment 700 for implementing the various aspects of the invention includes a conventional computer 702, including a processing unit 704, a system memory 706, and a system bus 708 that couples various system components, including the system memory, to the processing unit 704. The processing unit 704 may be any commercially available or proprietary processor. In addition, the processing unit may be implemented as multi-processor formed of more than one processor, such as may be connected in parallel.

The system bus 708 may be any of several types of bus structure including a memory bus or memory controller, a peripheral bus, and a local bus using any of a variety of conventional bus architectures such as PCI, VESA, Microchannel, ISA, and EISA, to name a few. The system memory 706 includes read only memory (ROM) 710 and random access memory (RAM) 712. A basic input/output system (BIOS) 714, containing the basic routines that help to transfer information between elements within the computer 702, such as during start-up, is stored in ROM 710.

The computer 702 also may include, for example, a hard disk drive 716, a magnetic disk drive 718, e.g., to read from or write to a removable disk 720, and an optical disk drive 722, e.g., for reading from or writing to a CD-ROM disk 724 or other optical media. The hard disk drive 716, magnetic disk drive 718, and optical disk drive 722 are connected to the system bus 708 by a hard disk drive interface 726, a magnetic disk drive interface 728, and an optical drive interface 730, respectively. The drives 716-722 and their associated computer-readable media provide nonvolatile storage of data, data structures, computer-executable instructions, etc. for the computer 702. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 700, and further that any such media may contain computer-executable instructions for performing the methods of the present invention.

A number of program modules may be stored in the drives 716-722 and RAM 712, including an operating system 732, one or more application programs 734, other program modules 736, and program data 738. The operating system 732 may be any suitable operating system or combination of operating systems. By way of example, the application programs 734 and program modules 736 can include a persistent state scheme in accordance with an aspect of the present invention.

A user can enter commands and information into the computer 702 through one or more user input devices, such as a keyboard 740 and a pointing device (e.g., a mouse 742). Other input devices (not shown) may include a microphone, a joystick, a game pad, a satellite dish, wireless remote, a scanner, or the like. These and other input devices are often connected to the processing unit 704 through a serial port interface 744 that is coupled to the system bus 708, but may be connected by other interfaces, such as a parallel port, a game port or a universal serial bus (USB). A monitor 746 or other type of display device is also connected to the system bus 708 via an interface, such as a video adapter 748. In addition to the monitor 746, the computer 702 may include other peripheral output devices (not shown), such as speakers, printers, etc.

It is to be appreciated that the computer 702 can operate in a networked environment using logical connections to one or more remote computers 760. The remote computer 760 may be a workstation, a server computer, a router, a peer device or other common network node, and typically includes many or all of the elements described relative to the computer 702, although for purposes of brevity, only a memory storage device 762 is illustrated in FIG. 7. The logical connections depicted in FIG. 7 can include a local area network (LAN) 764 and a wide area network (WAN) 766. Such networking environments are commonplace in offices, enterprise-wide computer networks, intranets and the Internet.

When used in a LAN networking environment, for example, the computer 702 is connected to the local network 764 through a network interface or adapter 768. When used in a WAN networking environment, the computer 702 typically includes a modem (e.g., telephone, DSL, cable, etc.) 770, or is connected to a communications server on the LAN, or has other means for establishing communications over the WAN 766, such as the Internet. The modem 770, which can be internal or external relative to the computer 702, is connected to the system bus 708 via the serial port interface 744. In a networked environment, program modules (including application programs 734) and/or program data 738 can be stored in the remote memory storage device 762. It will be appreciated that the network connections shown are exemplary and other means (e.g., wired or wireless) of establishing a communications link between the computers 702 and 760 can be used when carrying out an aspect of the present invention.

In accordance with the practices of persons skilled in the art of computer programming, the present invention has been described with reference to acts and symbolic representations of operations that are performed by a computer, such as the computer 702 or remote computer 760, unless otherwise indicated. Such acts and operations are sometimes referred to as being computer-executed. It will be appreciated that the acts and symbolically represented operations include the manipulation by the processing unit 704 of electrical signals representing data bits which causes a resulting transformation or reduction of the electrical signal representation, and the maintenance of data bits at memory locations in the memory system (including the system memory 706, hard drive 716, floppy disks 720, CD-ROM 724, and remote memory 762) to thereby reconfigure or otherwise alter the computer system's operation, as well as other processing of signals. The memory locations where such data bits are maintained are physical locations that have particular electrical, magnetic, or optical properties corresponding to the data bits.

Figure 8:
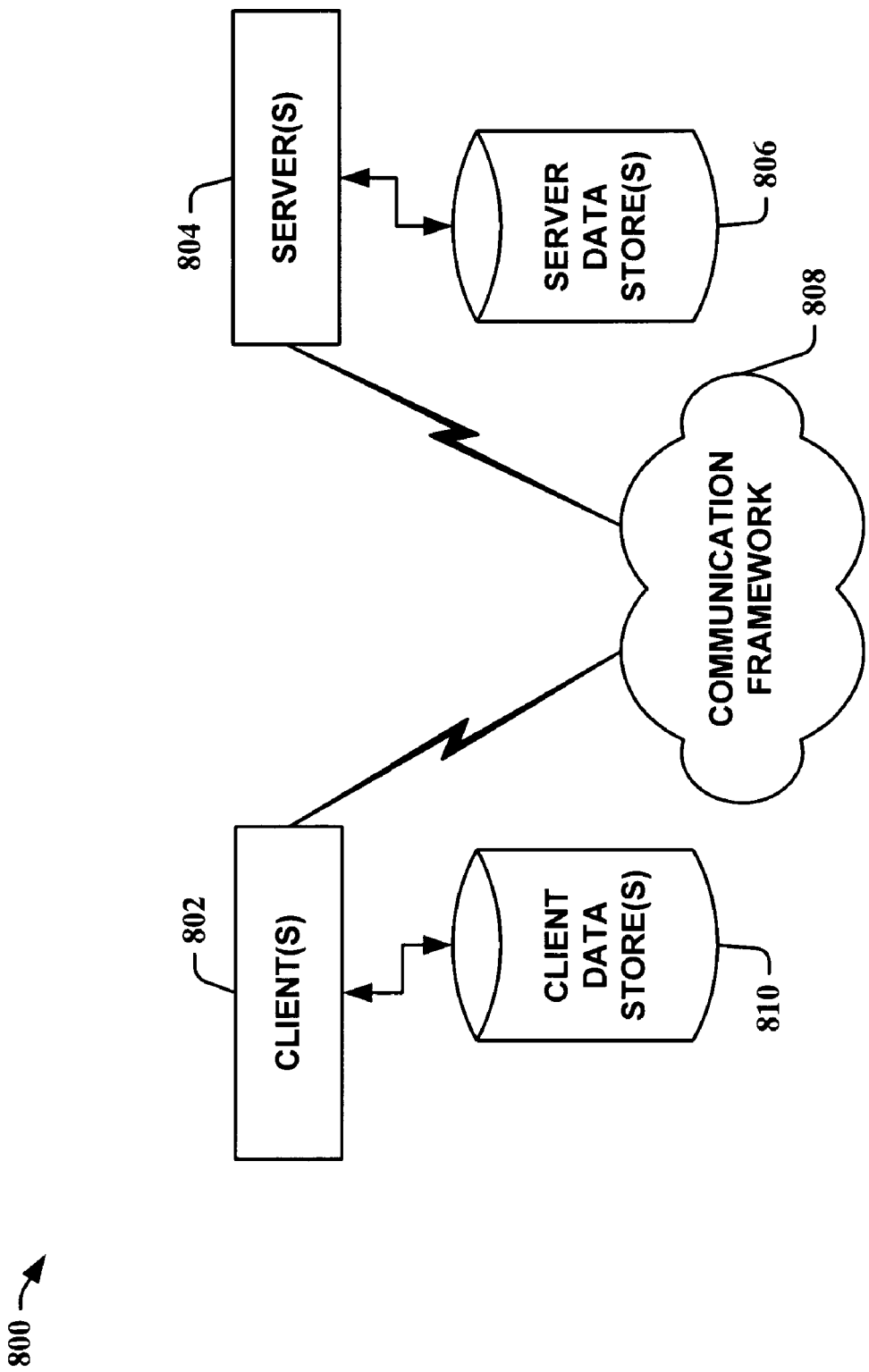
FIG. 8 illustrates another example operating environment in which the present invention can function.

FIG. 8 is another block diagram of a sample computing environment 800 with which the present invention can interact. The system 800 further illustrates a system that includes one or more client(s) 802. The client(s) 802 can be hardware and/or software (e.g., threads, processes, computing devices). The system 800 also includes one or more server(s) 804. The server(s) 804 can also be hardware and/or software (e.g., threads, processes, computing devices). One possible communication between a client 802 and a server 804 may be in the form of a data packet adapted to be transmitted between two or more computer processes. The system 800 includes a communication framework 808 that can be employed to facilitate communications between the client(s) 802 and the server(s) 804. The client(s) 802 are connected to one or more client data store(s) 810 that can be employed to store information local to the client(s) 802. Similarly, the server(s) 804 are connected to one or more server data store(s) 806 that can be employed to store information local to the server(s) 804.

In one instance of the present invention, a data packet transmitted between two or more computer components that facilitates persistent states is comprised of, at least in part, information relating to a web service component that unilaterally provides, at least in part, information to facilitate recovery of an entity from a fault condition where the information is based on, at least in part, requests received from the entity.

It is to be appreciated that the systems and/or methods of the present invention can be utilized in persistent state facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates persistent states, the system comprising:

a memory; and a processor coupled to the memory, the processor executing components comprising:

an interaction component that interacts with at least one entity and unilaterally provides interaction information to facilitate recovery of the entity from a fault condition;

wherein the interaction information is based on, at least in part, a request received from the entity;

wherein the request includes a unique work item ID for tracking the request and enabling exactly-once execution of the request; and wherein the interaction information is released based upon, at least in part, at least one process selected from a group consisting of a no release required process, a release encouraged process, and a release required process; and a persistent state component that ensures that executions of requests of the entity result in persistent state changes and that messages to the entity are persistent, wherein the persistent state component is configured to ensure idempotent execution of the request by using the unique work item ID to ensure the request is executed exactly-once by performing acts comprising:
    determining if the unique work item ID is being tracked in a message queue; and
    determining if the unique work item ID is present in a request message or a reply message:
        if the unique work item ID is present in a request message, cancelling the request, the request being a duplicate of a pending request; and
        if the unique work item ID is present in a reply message, sending the reply message to the entity in response to the request, the request being a duplicate of a completed request.

2. The system of claim 1, the interaction component further provides the entity with at least one selected from the group consisting of duplicate commit request elimination, persistent state transitions, and unique persistent reply requests.

3. A web service component that employs the system of claim 1.

4. The system of claim 1, the entity resides, relative to the persistent state component, in a location that is at least one selected from the group consisting of local and remote.

5. The system of claim 1, the interaction component interacts with the entity via the World Wide Web.

6. The system of claim 1, the interaction component further employs at least one selected from the group consisting of a persistent application, a workflow, a transactional queue, a database, and a file system to facilitate in providing the interaction information.

7. The system of claim 1, the interaction component enables transparent state persistence for the entity.

8. The system of claim 1, the interaction component enables automatic recovery for the entity.

9. The system of claim 1, the entity comprising at least one selected from the group consisting of a software application, a web service, a client application, and a middle-tier application that is part of an application server.

10. The system of claim 1, the interaction component provides information for at least one persistent component (Pcom) based entity that enables crash recovery.

11. A method for facilitating persistent states for entities, the method comprising:
    interacting via a web service with at least one entity;
    unilaterally determining, by a processor of the web service, interaction information based on, at least in part, a request received from the entity including a request for service and a request for cancellation of service;
    wherein the processor is configured to execute a persistent system component which ensures idempotent execution of the request;
    wherein the request includes a unique work item ID for tracking the request and enabling exactly-once execution of the request; and
    wherein the interaction information is released based upon, at least in part, at least one process selected from a group consisting of a no release required process, a release encouraged process, and a release required process;
    providing the interaction information to facilitate recovery of the entity from a fault condition;
    determining if the unique work item ID is being tracked in a message queue; and
    determining if the unique work item ID is present in a request message or a reply message:
        if the unique work item ID is present in a request message, cancelling the request, the request being a duplicate of a pending request; and
        if the unique work item ID is present in a reply message, sending the reply message to the entity in response to the request, the request being a duplicate of a completed request.

12. The method of claim 11 further comprising:
receiving a request from the entity;
checking a message queue for the presence of the request;
determining if a reply message is available in the message queue for the request;
waiting for the request to be processed and a reply message to be generated if the request is present in the message queue and the reply message is absent; and
sending the reply message to the entity if a reply message is present in the message queue.

13. The method of claim 11 further comprising:
receiving a cancel request with a unique work item ID from the entity;
determining if the unique work item ID exists in a message queue; and
canceling a request associated with the unique work item ID in the message queue if the ID is present in the message queue.

14. The method of claim 11, determining the interaction information comprising:
receiving a request with a unique work item ID from the entity;
determining if the unique work item ID exists in a work item database that contains a unique work item ID field for at least one work item in the database; and
entering the unique work item ID in the unique work item ID field associated with an appropriate work item if the unique work item ID is absent from the work item database.

15. The method of claim 14 further comprising:
retaining the unique work item ID with the work item for an entire time that the work item is relevant.

16. The method of claim 11 further comprising:
receiving a cancel request with a unique work item ID from the entity;
determining if the unique work item ID exists in a work item database that contains a unique work item ID field for at least one work item in the database; and
canceling a request associated with the unique work item ID in the work item database if the ID is present in the work item database.

17. The method of claim 11 further comprising:
providing the entity with at least one selected from the group consisting of duplicate commit request elimination, persistent state transitions, and unique persistent reply requests.

18. The method of claim 11 further comprising:
employing at least one selected from the group consisting of a persistent application, a workflow, a transactional queue, a database, and a file system to facilitate in providing the idempotent execution for the requests from the entity.

19. The method of claim 11 further comprising:
providing transparent state persistence for the entity.

20. The method of claim 11 further comprising:
providing an automatic recovery for the entity.

21. The method of claim 11, the entity comprising at least one selected from the group consisting of a software application, a web service, a client application, and a middle-tier application that is part of an application server.

22. The method of claim 11 further comprising:
providing crash recovery information for at least one persistent component (Pcom) based entity.

23. The method of claim 11 further comprising:
interacting with the entity via the Internet.

24. A system that facilitates persistent states, comprising:
means for interacting with at least one entity; and
means for unilaterally providing interaction information to facilitate recovery of the entity from a fault condition including a system failure, an entity failure, and an application component failure; the information based on, at least in part, requests received from the entity including a request for service and a request for cancellation of service;
means for storing the interaction information in a persistent state in accordance with a unilateral pledge, to the entity, to ensure idempotent execution of one or more requests from the entity;
means for releasing persistence of the information according to a release obligation in accordance with the unilateral pledge, the release obligation comprising:

no release required, wherein without instruction to the contrary, the interaction information is remains persistent;

release encouraged, wherein an incentive is provided to the entity to release the obligation to maintain persistence of the information;

release strongly encouraged, wherein denying service to the entity until the entity releases the obligation to maintain persistence of the information; or release required, wherein the obligation to maintain persistence of the information is released upon a subsequent contact with the entity or subsequent unilateral pledge to the entity.

25. A computer readable storage medium having stored thereon computer executable components of the system of claim 1.

26. A device employing the method of claim 11 comprising at least one selected from the group consisting of a computer, a server, and a handheld electronic device.

27. A device employing the system of claim 1 comprising at least one selected from the group consisting of a computer, a server, and a handheld electronic device.

* * * * *